Dec. 16, 1958    H. C. FLINT    2,864,434
MOUNTING MEANS FOR SPRING ENDS
Filed Nov. 4, 1954    5 Sheets-Sheet 1
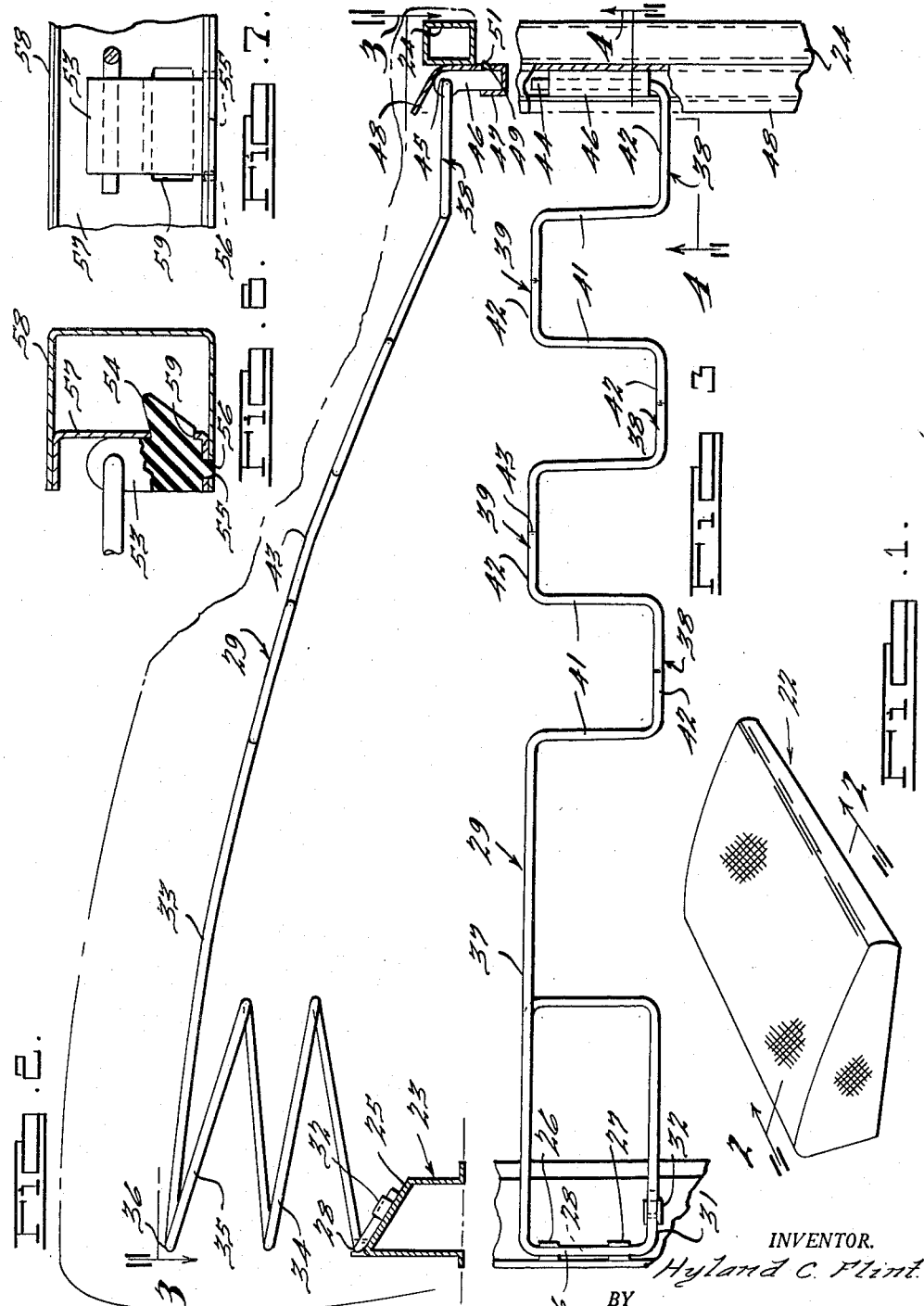
INVENTOR.
Hyland C. Flint.
BY
Harness, Dickey & Pierce
ATTORNEYS.

Dec. 16, 1958
H. C. FLINT
2,864,434
MOUNTING MEANS FOR SPRING ENDS
Filed Nov. 4, 1954
5 Sheets-Sheet 2
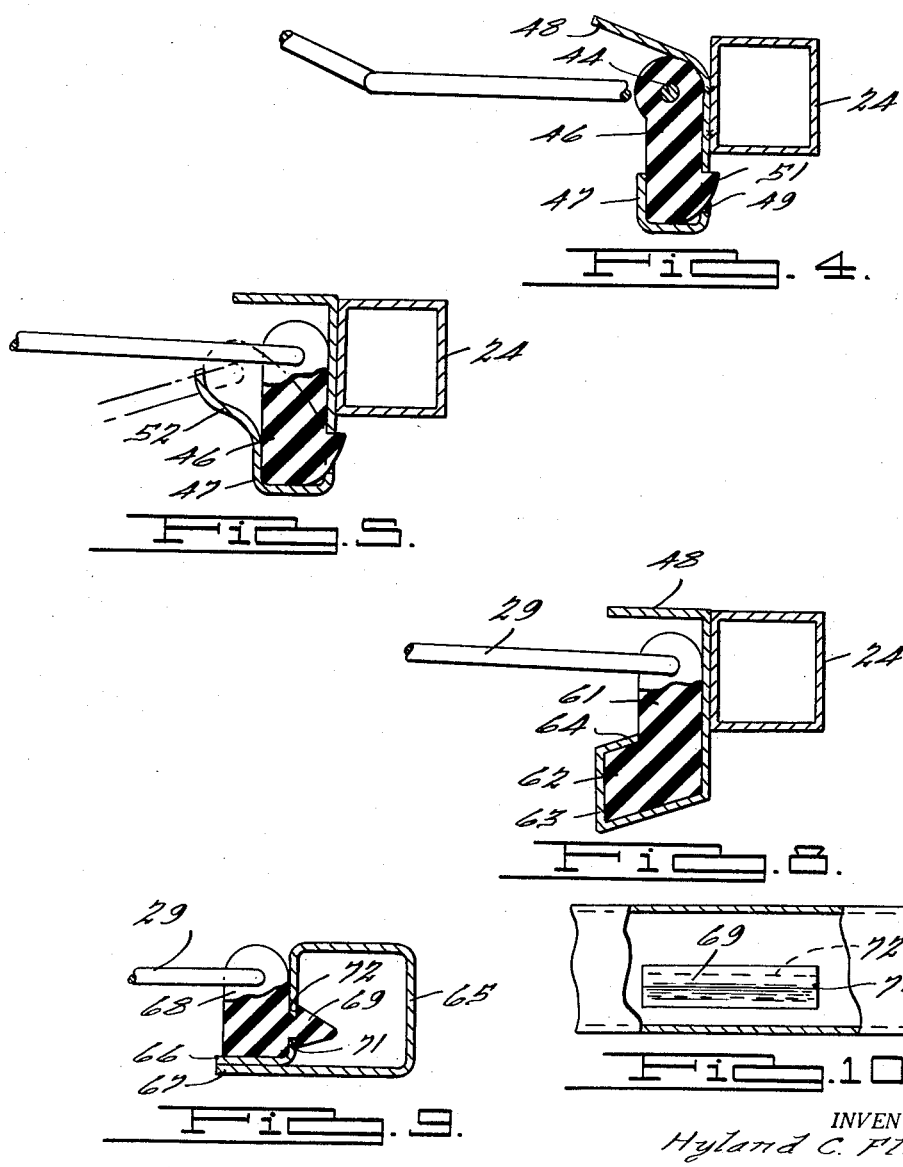

Dec. 16, 1958   H. C. FLINT   2,864,434
MOUNTING MEANS FOR SPRING ENDS
Filed Nov. 4, 1954   5 Sheets-Sheet 3

INVENTOR.
Hyland C. Flint
BY
Harness, Dickey & Pierce.
ATTORNEYS.

Dec. 16, 1958     H. C. FLINT     2,864,434
MOUNTING MEANS FOR SPRING ENDS
Filed Nov. 4, 1954     5 Sheets-Sheet 4
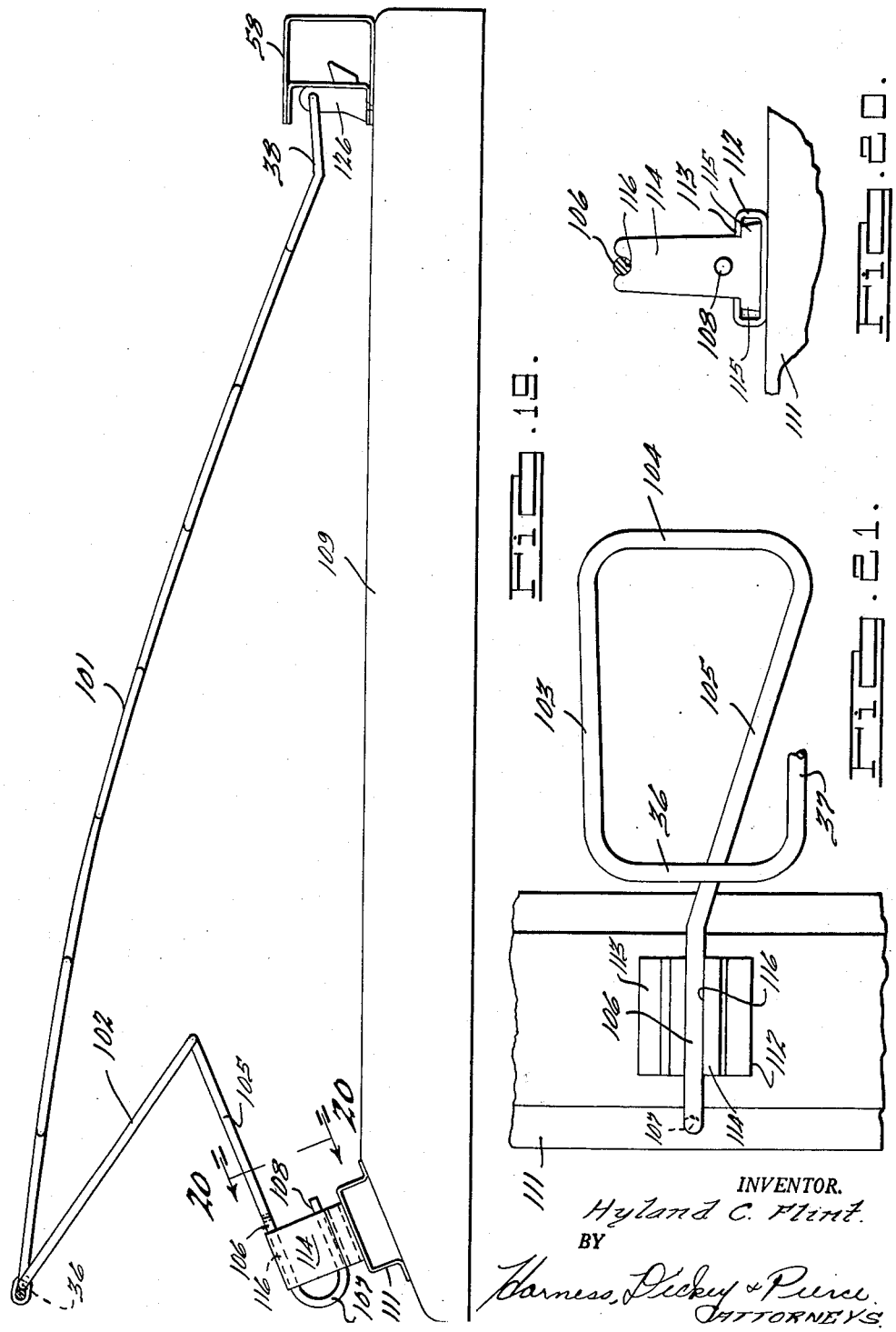
INVENTOR.
Hyland C. Flint.
BY
Harness, Dickey & Pierce
ATTORNEYS

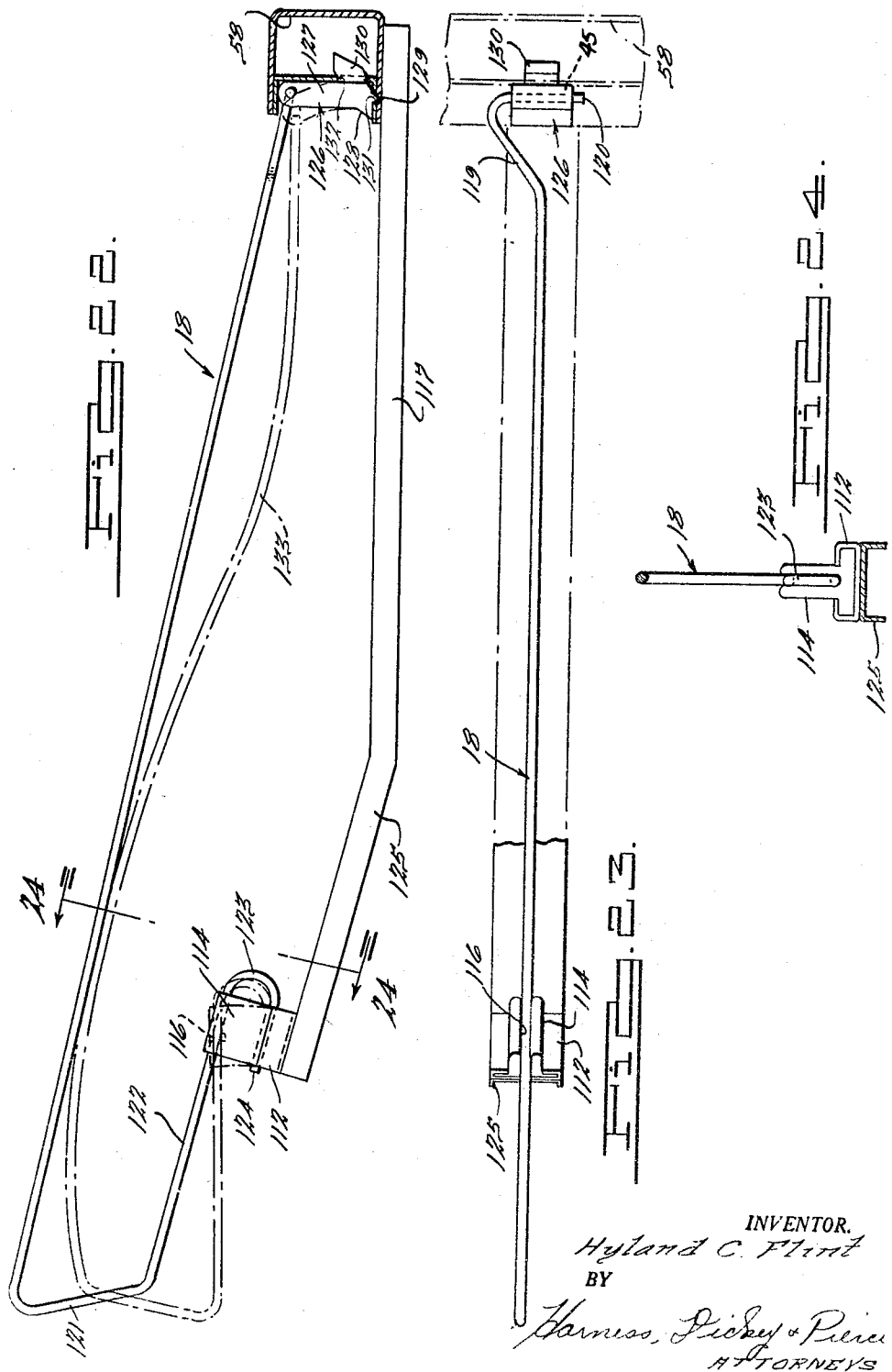

_United States Patent Office_

2,864,434
Patented Dec. 16, 1958

2,864,434

MOUNTING MEANS FOR SPRING ENDS

Hyland C. Flint, Birmingham, Mich., assignor to American Metal Products Company, Detroit, Mich., a corporation of Michigan Application November 4, 1954, Serial No. 466,906

21 Claims. (Cl. 155—179)

This invention relates to spring cushion constructions and particularly to a resilient support for the end or ends of the spring strips forming the resilient surface of the cushion.

When constructing springed cushions for automotive seating and particularly the seat cushion thereof, difficulty has been experienced in anchoring the read end of the spring strips. The major part of the weight of the occupant is supported near the rear of the seat, and when the support for the strip end is hard, it is felt by the occupant. The rigid anchoring of the strip ends produce an undesirable pressure and discomfort for the occupant. In the patent to Williams et al., No. 2,526,184, issued October 17, 1950, the end of the spring strip itself was provided with a Z-shape and pivoted so as to free the seating portion of the spring strips from direct pressure of the support.

In the present arrangement, an entirely different concept is employed both in the construction of the spring strip and in the mounting thereof. The spring strip is made from formed wires so that the loops at the rear may be varied in width while the forward portion is a straight length of wire which is formed into a plurality of the sections to provide height at the front end of the strip. The front end of the strip may be rigidly anchored to a base support against a downward bending movement preventing the V portions from rocking and forcing them to deflect downwardly under load somewhat in the nature of a coil spring. The read ends of the strips are mounted in rubber blocks which may deflect forwardly under compression to thereby reduce the pressure which would otherwise occur when the end of the strip was secured directly to the frame. The blocks may take various forms so long as they may be rigidly anchored in the member of the frame and permit the spring strip ends to move forwardly against the compression in the rubber of the blocks. Such rubber blocks may be employed both at the front and rear of the cushion assembly and when used at the front end prevent shock and set which sometimes occurs to the bottom supporting loop which breaks over the supporting rail. The rubber blocks supported on the forward and/or rearward cross members of the frame break the tie to the floor and provide a floating end to the spring strips.

Accordingly, it is the main object of the present invention: to mount the end of a formed spring strip in a rubber block which permits the end to float; to separate the end of a spring strip from the supporting rail by a rubber block which is free to deflect permitting the end of the spring to float; to provide a rubber block on the front and rear cross members of a seat frame to which the ends of formed spring strips are secured in a manner to permit the ends to float relative to the support thereby removing the feel of the support from the occupant, and, in general, to provide a flexible mounting for a sinuous spring strip which is simple in construction, positive in operation and economical of manufacture.

Other objects and features of novelty of the invention will be specifically pointed out, or will become apparent when referring, for a better understanding of the invention, to the following description taken in conjunction with the accompanying drawings, wherein—

Figure 1 is a perspective view of a finished seat cushion embodying features of the present invention;

Fig. 2 is an enlarged sectional view of the structure illustrated in Fig. 1, taken on the line 2—2 thereof;

Fig. 3 is a plan view of the structure illustrated in Fig. 2, taken as viewed from line 3—3 thereof;

Fig. 4 is an enlarged sectional view of the structure illustrated in Fig. 3, taken on the line 4—4 thereof;

Fig. 5 is a view of the structure illustrated in Fig. 4, showing a modified form thereof;

Fig. 6 is a view of structure, similar to the one illustrated in Fig. 4, showing a further form which the invention may assume;

Fig. 7 is a front face view of the structure illustrated in Fig. 6;

Fig. 8 is a view of structure, similarly illustrated in Fig. 4, showing another form thereof;

Fig. 9 is a view of structure, similarly illustrated in Fig. 4, showing a still further form which the invention may assume;

Fig. 10 is a front face view of the structure illustrated in Fig. 9;

Fig. 19 is a view of structure, similarly illustrated in Fig. 2, showing a further form which the invention may assume;

Fig. 20 is a sectional view of the structure illustrated in Fig. 19, taken on the line 20—20 thereof;

Fig. 21 is a broken plan view of the front end portion of the structure illustrated in Fig. 20;

Fig. 22 is a view of structure, similar to that illustrated in Fig. 19, showing a further form of the invention;

Fig. 23 is a plan view of the structure illustrated in Fig. 22, and

Fig. 24 is a sectional view of the structure illustrated in Fig. 22, taken on the line 24—24 thereof.

Figure 11:
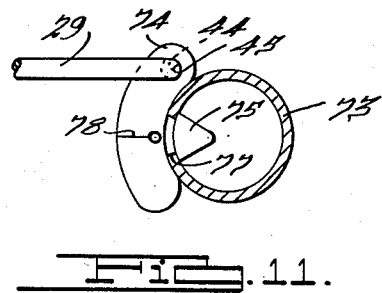
Fig. 11 is a sectional view of the structure illustrated in Fig. 4, showing a further form of the invention.

Referring to Figs. 1 to 5, a seat construction 22 is illustrated embodying a frame having a transverse front rail 23 and a transverse rear rail 24 joined together by side rails in the conventional manner. The front rail has a sloping web 25 containing a series of struck-up tongues 26 and 27 for receiving the end transverse bar 28 of a formed spring strip 29 having a reversely bent end 31 which extends within a trunnel 32 struck upwardly from the sloping web 25. The means for securing the end of the formed strip to the rail is illustrated, described and claimed in the copending application to Hyland C. Flint, et al., Serial No. 390,228, filed November 4, 1953, now U. S. Patent No. 2,849,056, granted August 26, 1958, and assigned to the assignee of the present invention.

It has been the practice to provide a V-shaped supporting portion for the front end of the load supporting portion 33 of the formed spring strip and in the present arrangement, a W-shaped portion 34 is provided. The topmost transverse cross bar 36 of the W-shaped supporting portion has a straight wire portion 37 extending rearwardly therefrom and formed into a plurality of oppositely presenting rectangular shaped loops 38 and 39. These loops comprise transverse torsion bars 41 which are joined by longitudinally extending bendable bars 42. The bendable bars 42 may be of different lengths to control the strength of the formed spring strip and may be bent near the center, at 43, to produce a contour thereto, in the manner illustrated and described in the copending application to Hyland C. Flint, Serial No. 386,525, filed October 16, 1953, now U. S. Patent No. 2,845,996, granted August 5, 1958, and assigned to the assignee of the present invention.

To produce the desired comfort to the anchored formed spring strip, the rear loop of the spring strip is extended at an angle and provided with an end torsion bar 44. The end torsion bar extends through an aperture 45 in a resilient block 46 which is made of natural or synthetic rubber or of other known resilient composition. The lower portion of the block extends within a channel element 47 secured to the rear transverse rail 24 which is preferably provided with an overhanging flange 48 for a purpose which will be explained hereinafter.

A slot 49 is provided at spaced intervals along the web of the channel element 47 for receiving a lip 51 which extends from the rear surface of the supporting block 46. The rearwardly projecting lip 51 locks the block within the channel element and prevents it from being drawn from the channel when the top end of the block is deflected outwardly from the rail when a load is applied to the spring strip 29. It will be noted that the formed spring strip illustrated in Fig. 2 has the load supporting portion 33 thereof arched to provide a desired contour thereto when mounted and that the rearmost loop 38 is disposed in a substantially horizontal plane at an angle to the forward section of the load supporting portion.

As will readily be seen from Figs. 2 and 4, the blocks 46 are forced rearwardly and downwardly into the channel portion 47 in such manner as to have the rearward extending lips 51 project within the slots 49. The lips securely anchor the blocks within the channel element against accidental removal when a load is applied to the load supporting portion 33 of the spring strip. The end torsion bar 44 will be drawn forwardly as illustrated more specifically in Fig. 5, permitting the end of the spring strip to float relative to the rear transverse rail which thereby eliminates the shock and pressure which was experienced when the spring strip was secured directly to the rail. Because of this forward deflection of the blocks under static and shock loads, the forwardly extending flange 48 prevents the pad of cotton, foam rubber or other material placed upon the spring surface from being forced between the rear faces of the blocks 46 and the rearward supporting wall of the channel element which would prevent the blocks from returning to their original position. The material of the blocks is under compression when the spring strips are loaded, which is desirable to provide long life to the blocks. The aperture through the upper end of the blocks is small, and soapy water is preferably employed to permit the ready application of the end torsion bar 44 therethrough so that after the water becomes dried, the torsion bar will be firmly held within the aperture.

In Fig. 5 a similar construction is illustrated except that the channel 47 has an arcuate shaped flange portion 52 extending upwardly and forwardly as clearly illustrated in the figure employed to limit the forward movement of the blocks 46 when a load greater than normal load, such as a shock load, is applied to the formed spring strips. Otherwise the structure is substantially the same as that illustrated in Fig. 4.

In Fig. 6 a somewhat similar construction is illustrated with the exception that the blocks 53 besides having the rearwardly extending lip 54, are provided with a downwardly extending tongue 55 which projects within an aperture 56 in the bottom of the channel element 57 that telescopes within a channel element 58 which forms the transverse rear rail of the frame assembly. In this arrangement, the block has the end 54 moved rearwardly through the slot 59 in the web of the channel 57 and the block is then moved downwardly to have the projecting finger 55 extend within the slot 56 in the flanges of the channel element 57 and 58. The block 53 functions in the same manner as the block 46, the upper end thereof receiving the end torsion bar 44 thereby floating the end and permitting it to be drawn forwardly when the spring strip is loaded.

In Fig. 8 a block 61 is illustrated having a downwardly and forwardly extending portion 62 which is secured within a channel portion 63 having a reversely turned flange 64. The downwardly and forwardly extending portion 62 of the block 61 wedges within the channel and the flange portion 64 and is thereby anchored against withdrawal when the formed spring 29 is loaded and the end 44 moves forwardly as the upper portion of the resilient block 61 is deflected.

In Fig. 9 a further form of frame and block construction is illustrated wherein a rectangular frame element 65 has forwardly projecting mating flanges 66 and 67 on which a resilient block 68 rests when a rearwardly projecting tongue 69 thereof extends within an aperture in the adjacent face of the rectangular portion 65. The tongue 69 is provided with slots 71 and 72 in which the metal defining said aperture extends to provide a secure anchor against the block pulling out when the upper portion thereof deflects forwardly when the formed spring strip 29 is loaded.

Figure 12:
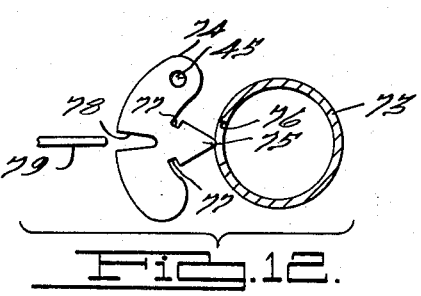
Fig. 12 is an exploded view of the structure illustrated in Fig. 11.

Referring to Figs. 11 and 12, a form of resilient mounting for the end of the spring strip is illustrated when applied to a tubular frame element 73. Arcuate blocks 74 of resilient material as illustrated in Fig. 12 are provided with a tongue 75 which is projectable through a slot 76 in the tubular element 73. Slots 77 at the base of the tongue receive the metal at the edges of the slot to firmly anchor the tongue within the tubular rail element. A slot 78 is provided in the forward portion of the block in which the end 79 of a screw driver or similar tool may be inserted to apply force directly to the base of the tongue 75 to force it through the slot 76. When in mounted position, the upper and lower ends of the block are moved outwardly by the rail element to close the slot 78 as clearly illustrated in Fig. 11. An aperture 45 is provided in the upper end of the block in which the endmost torsion bar 44 of the spring strip is retained. The upper end of the resilient block 74 is free to deflect from the tubular frame element 73 when load is applied to the formed spring 29 in the manner as described hereabove.

Figure 13:
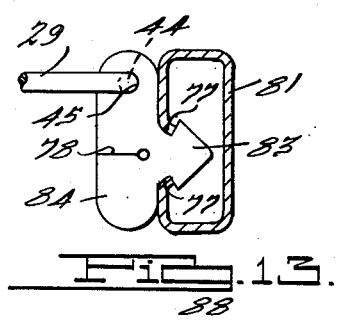
Fig. 13 is a view of structure, similarly illustrated in Fig. 11, showing a further form which the invention may assume.
Figure 14:
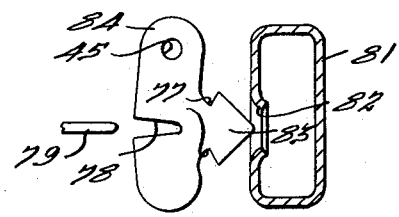
Fig. 14 is an exploded view of the structure illustrated in Fig. 13.

A construction similar to that of Figs. 11 and 12 is illustrated in Figs. 13 and 14. In this arrangement, a rectangular frame 81 is provided with elongated slot 82 for receiving a tongue 83 extending rearwardly from a resilient supporting block 84. Upper and lower part of the block is divided by a slot 78 for the reception of the end of a screw driver or like tool 79 which forces the tongue 83 directly into the slot 82 where it is anchored by the notches 77 provided at the base of the tongue. When forced against the front face of the rectangular frame element 81, the slot 78 is closed as illustrated in Fig. 13 in which arrangement the end torsion bar 44 of the formed spring 29 is supported in a manner to permit the upper end of the resilient block to move away from the supporting frame when the formed spring is loaded.

Figure 15:
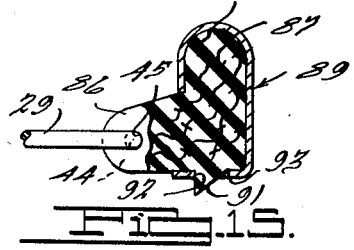
Fig. 15 is a view of structure, similarly illustrated in Fig. 4, showing a still further form which the invention may assume.

In Fig. 15 a quite different form of the invention is illustrated wherein a resilient block 86 has an upwardly extending body portion 87 which is forced into an arcuate channel portion 88 of a transverse frame member 89. The block has an anchoring tongue 91 on the bottom face which drops within a slot 92 in a bottom flange 93 of the frame member 89. The transverse torsion bar 44 extends within an aperture 45 in the resilient block 86 and in this arrangement, when the formed spring 29 is loaded, the projecting end of the block 86 may deflect downwardly and may move forwardly due to the stretching of the resilient material of the block.

Figure 16:
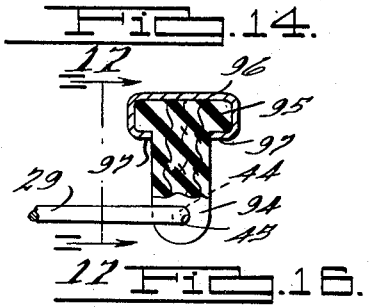
Fig. 16 is a view of structure, similarly illustrated in Fig. 4, showing a still further form of the invention.
Figure 17:
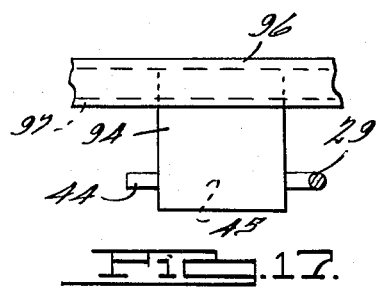
Fig. 17 is a sectional view of the structure illustrated in Fig. 16, taken on the line 17—17 thereof.

In Fig. 16 a still further form of resilient block 94 is illustrated. The block has a rectangular base portion 95 which is supported within a rectangular channel frame element 96 between spaced flanges 97 at the one face thereof. A projecting portion of the block has an aperture 45 in which the end transverse torsion bar 44 of the spring strip 29 extends so that when the spring strip is loaded the end may be drawn forward and deflected downwardly due to the resiliency of the block 94.

Figure 18:
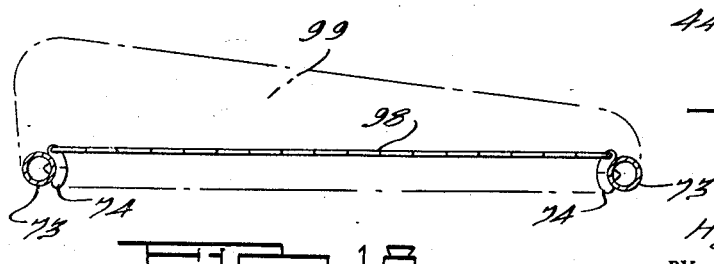
Fig. 18 is a sectional view of a seat in which the spring strips are mounted on supporting elements illustrated in Fig. 11.

In Fig. 18 a spring assembly is illustrated employing the blocks 74 on the inner faces of the front and rear tubular frame elements 73 which support straight formed spring strips 98. End torsion bars 44 secured in apertures 45 in the resilient blocks 74 support the spring strips which form a flat resilient support on which a foam rubber pad 99 is directly secured. The formed spring strips 98 may have or may assume a desired contour when the seat cushion is loaded both due to the resiliency of the strip and the resiliency of the blocks 74 which permits the ends of the spring strips to move inwardly toward each other permitting the deflection of the strips 98 and the assumption thereof of a desirable contour which conforms to the load applied by the occupant.

Referring to Figs. 19, 20 and 21, a still further form of the invention is illustrated, wherein a spring 101 of the formed type, referred to hereinabove, has the rear end loop extended at an angle to be disposed substantially horizontal. The end torsion bar 44 is secured to the rear transverse frame element 58 by a rubber block 126, hereinafter to be described. The front end has a supporting portion 102 of single V formation extending downwardly at the forward end of the load supporting portion of the spring from the front cross bar 36. The supporting portion 102 embodies a downwardly sloping section 103, transverse torsion bar 104 and a downwardly and inwardly sloping section 105 which terminates in a straight section 106 in the axis of the strip. The end of the straight section is reversely bent downwardly to form a loop 107 having a rearwardly extending straight portion 108 aligned in a vertical plane with the straight portion 106.

A rectangular frame member 109 supports the rear transverse member 58 and the front transverse inverted channel element 111, having its web disposed at an angle to the horizontal. A plurality of channel-shaped clips 112, having inturned flanges 113, support a plurality of spaced rubber blocks 114 along the front element 111. The blocks have extending flanges 115 which are engaged by the flanges 113 of the clips to secure the block firmly thereto. The top of the blocks have a recess 116 disposed parallel to the aperture 45 disposed therebelow in such spaced relation that the straight portion 106 of the spring 101 is supported within the slot 116 when the end 108 of the spring is disposed within the aperture 45. In this arrangement, additional resiliency is provided to the front support for the spring which eliminates shock and fatigue to the torsion bars thereof due to the forward and rearward flexing of the block when shock load is applied thereto. When the seat is occupied, the load supporting portion of the spring 101 contours in accordance with the applied load so that not only is comfort provided by the contouring and the flexing of the spring, but also by the rubber blocks 114 at the front and 126 at the rear which separate the springs from the metal rails and floor of the vehicle.

Referring to Figs. 22, 23 and 24, a still further form of the invention is illustrated resulting from the use of the rubber supporting blocks and springs of Figs. 19, 20 and 21. It will be noted that the spring 18 has no loops therein and is maintained on the center line of the blocks by the angular offset portion 119 from which the transverse securing end 120 extends. This end is disposed within an aperture 45 at the top end of the block 126, the upwardly extending body portion 127 which is of substantial length so as to permit a greater lateral deflection to the spring end 120. The double channel rear supporting member 58 of the frame receives the upper block 126 which is anchored therein by a downwardly extending lip 129 projecting within a slot 131 in the element 58 and a rearwardly extending lip 130 extending within a slot 132 of the element 58. It will be noted that the forward lower portion of the block is widened due to the sloping surface 128, to make certain that the lower portion is securely supported and anchored on the element 58.

The wire of the spring 18 extends forwardly to the front edge of the cushion and is bent downwardly at 121 and reversely bent at 122 and further reversely bent to form the loop 123 and the end 124. The end 124 extends within an aperture 45 in the block 114 and a portion of the rearwardly bent section 122 adjacent to the loop 123 rests within the slot 116 at the top of the block. The block is secured in clips 112 by the flanges 113 which extend over the projecting flanges 115 of the block. The frame 117, on which the member 58 is secured at the rear and on which the clips 112 are secured in the forward end, is of inverted channel section, having a front end portion 125 which slopes upwardly to tilt the blocks 114 rearwardly opposite to the forward tilt to the block 114 on the transverse channel member 111 of the structure illustrated in Figs. 19, 20 and 21. The straight portions of the spring which support the load are covered in the usual manner by wire webbing, known as insulators in the trade, on which a pad of sponge rubber, cotton or the like is supported. The spring wires and insulators assume a desired contour illustrated in dotted lines at 133 when the seat is loaded. When loaded, the rubber block 126 is drawn forwardly the same as the rubber block 114, providing a soft edge at the top front end of the seat which deflects according to the load which is supported thereon. In view of the fact that the springs alone are not depended upon for softness, as in the past when the ends were directly anchored to the frame, it is within the purview of the invention to set the straight portion of the spring 18 to a contour simulating the arcuate contour at the rear half of the spring, to thereby reduce the overall height of the seat. The set springs provide the desired contour comfort while the rubber blocks provide the desired resiliency free from shock and thereby meet the requirements of the low automobile bodies now being produced in the trade. When using the straight wire as a spring and the rubber blocks as a support, not only is an advantage obtained in the overall height of the seat cushion but a substantial saving in cost results. Added comfort to the occupant also results as the occupied area is entirely disconnected shockwise from the vehicle body in view of the rubber block supports. This breaking of the connection of the metal ends of the springs from direct engagement to the metal parts of the body by the use of the rubber blocks eliminates the transfer of shocks from the body directly to the springs. Since such shock loads cannot be transferred from the body to the occupant of the cushion, uniform comfort is provided to the occupant. Since the shock load is taken by the forward deflection of the rubber blocks, the tossing of the occupant resulting from the vertical rebound of the spring is eliminated. The shock loads result in the forward displacement of the rubber blocks and the movement of the occupant in the direction of movement of the vehicle rather than transverse thereto. The shock loads often caused a set to occur in sections of the spring strip, which changed the spring action and the contour appearance of the seat when unloaded. With the present arrangement, no such set can occur to any section of the spring strip.

What is claimed is:

1. An upstanding rubber block having a hole therethrough at one end for receiving and supporting an end of a spring which extends substantially at right angles to said block, the opposite end of the block having means thereon by which said opposite end is secured to a frame element permitting the end having the aperture therein to tilt from said frame element toward the main body of the spring when the spring is loaded.

2. The combination with a transverse rail element of a seat frame having a plurality of spaced apertures therealong, and blocks of resilient material having lips extending therefrom securable in said slots to lock the blocks on the rail element in substantially right angle relation, each said block having an aperture therethrough remote from said lip for receiving and supporting the end of the spring strip in position to cause the upper end of the block to tilt from the bottom anchored portion toward the main body of the spring when the spring is loaded.

3. The combination with a transverse rail element of a seat frame having a plurality of spaced apertures therealone, and blocks of resilient material having lips extending therefrom securable in said slots to lock the blocks on the rail element in substantially right angle relation thereto, each said block having an aperture therethrough remote from said lip for receiving and supporting the end of a spring strip, the spring strip being disposed substantially at right angles to the block, said rail element having a projecting flange which extends over the portion of the block having said aperture, whereby the block will tilt from the bottom anchored portion toward the main body of the spring when the spring is loaded.

4. The combination with spaced front and rear transverse rail elements of a seat frame having a plurality of spaced apertures therealong, blocks of resilient material having lips extending therefrom received in said slots to lock the blocks on the rail element, each said block having an aperture therethrough remote from said lip receiving and supporting the end of a spring which is deflectable with said remote end, each spring having U-shaped loops therein adjacent to the end supported by said blocks and a straight portion forwardly thereof from which a formed section is folded back and forth in W shape, with a lower end having means by which attachment is made to a front rail element of said seat frame.

5. The combination with spaced front and rear transverse rail elements of a seat frame having a plurality of spaced apertures therealong, blocks of resilient material having lips extending therefrom received in said slots to lock the blocks on the rail element, each said block having an aperture therethrough remote from said lip receiving and supporting the end of a spring which is deflectable with said remote end, each spring having U-shaped loops therein adjacent to the end supported by said block and a straight portion forwardly thereof from which a formed section is folded back and forth in V shape, with a lower end having means by which attachment is made to a front rail element of said seat frame.

6. The combination with spaced front and rear transverse rail elements of a seat frame having a plurality of spaced apertures therealong, blocks of resilient material having lips extending therefrom received in said slots to lock the blocks on the rail element, each said block having an aperture therethrough remote from said lip receiving and supporting the end of a spring which is deflectable with said remote end, each spring having U-shaped loops therein adjacent to the end supported by said blocks and a straight portion forwardly thereof from which a formed section is folded back and forth in W shape, with a lower end having means by which attachment is made to a front rail element of said seat frame, and rubber blocks secured to said front rail element, each block having a slot in the top and an aperture near the bottom for supporting the end of the W-shaped portion.

7. The combination with spaced front and rear transverse rail elements of a seat frame having a plurality of spaced apertures therealong, blocks of resilient material having lips extending therefrom received in said slots to lock the blocks on the rail element, each said block having an aperture therethrough remote from said lip receiving and supporting the end of a spring which is deflectable with said remote end, each spring having U-shaped loops therein adjacent to the end supported by said block and a straight portion forwardly thereof from which a formed section is folded back and forth in V shape, with a lower end having means by which attachment is made to a front rail element of said seat frame, and rubber blocks secured to said front rail element, each block having a slot in the top and an aperture near the bottom supporting the end of the V-shaped portion.

8. In a cushion construction having a frame with spaced substantially parallel rail elements, aligned spaced resilient blocks on said rail elements, said blocks having means by which they are securely anchored to said rail elements in substantially right angle relation thereto, said blocks having apertures therethrough remote from said anchoring means, and spring elements supported on said frame solely by said blocks out of engagement with said rail elements in position to cause the upper end of the block to tilt from the bottom anchored portion toward the main body of the spring when the spring is loaded.

9. A cushion construction as recited in claim 8, wherein said spaced blocks are made of rubber.

10. A cushion construction as recited in claim 8, wherein the spring element is a straight wire having straight ends which are received by the apertures of said blocks.

11. A cushion construction as recited in claim 8, wherein the spring element has a straight wire portion and an off-set transverse end which aligns the straight portion with a block on the rear rail element when the end is supported thereby, said spring element having a front portion which is bent downwardly and then rearwardly and further bent downwardly and forwardly forming an end which is secured by a block on the front rail element.

12. A cushion construction as recited in claim 8, wherein the spring element has oppositely disposed loops adjacent the blocks on the rear rail element from which a straight wire portion extends to the forward edge from which a downwardly extending W-shaped supporting end is provided, said supporting end having the form of a loop by which the end is secured to the front rail element.

13. A cushion construction as recited in claim 8, wherein the spring element has oppositely disposed loops adjacent the blocks on the rear rail element from which a straight wire portion extends to the front edge from which a downwardly extending W-shaped supporting end is provided, said supporting end having the form of a loop, the lower end of which is secured in an aperture in the block on the front rail element, the upper loop portion resting in a slot in the top of the block.

14. The combination with a supporting frame for a seat cushion having side rails joined by front and rear rails, rubber blocks supported on the rear rails in a manner to permit one end to tilt forwardly thereof, resilient blocks mounted on the front rail element in a manner to permit the forward tilting thereof, and spring strips each having a load supporting portion and a downwardly extending front end supporting portion, the ends of the downwardly extending front supporting portion terminating in a loop disposed on the center of the spring and secured to a block on the front rail element, the rear end of said spring having a transversely extending portion which is secured to the deflectable end of said rear block.

15. In a seat construction, a frame having transversely disposed front and rear rail elements joined by side elements, rubber blocks extending upwardly on said front and rear rail elements having end portions which are movable forwardly and rearwardly of the frame, and spring strips disposed substantially at right angles to said blocks when spanning said frame with their ends supported by said blocks, in position to cause the upper ends of the blocks to tilt from the bottom anchored portions toward the main body of the springs when the springs are loaded.

16. In a seat construction, a frame having transversely disposed front and rear rail elements joined by side elements, and substantially vertically extending rubber mounting means on one of said rail elements having apertures for supporting the ends of spring strips disposed substantially in right angular relation thereto in a manner to permit the ends of the spring and the resilient means to deflect toward the other rail element when the springs are loaded.

17. In a seat construction, a frame having transversely disposed front and rear rail elements joined by side elements, rubber mounting means on one of said rail elements having apertures for supporting one end of spring strips in a manner to permit the ends and the resilient means to deflect relative to the other rail element, and substantially vertically extending rubber mounting means on the other rail element having apertures for supporting the opposite ends of the horizontally disposed spring strips in a manner to permit the last said ends of the spring strips and the last said rubber mounting means to deflect toward the one said rail element when the springs are loaded.

18. In a spring construction, a frame element, a rubberlike member having means on one end by which it is secured to the frame element with the opposite end free to deflect relative to said secured end, and means on said opposite end for supporting the end of a spring in position to cause the opposite end of the block to tilt from the bottom anchored portion toward the main body of the spring when the spring is loaded.

19. A resilient block for supporting the end of a spring strip on a frame having rearwardly extending means at the bottom for anchoring the block to a frame, the main portion of the block extending upwardly and having an aperture in the upper portion of the body for receiving the end of a spring in position to cause the block to tilt from the bottom anchored portion toward the main body of the spring when the spring is loaded.

20. A resilient block for supporting the end of a spring strip on a frame having rearwardly extending means at the bottom for anchoring the block to a frame, the main portion of the block extending upwardly and having an aperture in the upper forward portion of the body for receiving the end of a spring in position to cause the block to tilt toward the main body of the spring when the spring is loaded, the rearwardly extending portion being of T shape and the frame member having an open slot into which the T-shaped portion is insertable.

21. A resilient block for supporting the end of a spring strip on a frame having the lower end thereof attached to said frame, the upper end of said block having an aperture therein for receiving the end of the spring strip in position to cause the upper end of the block to tilt from the bottom anchored portion toward the main body of the spring when the spring is loaded.

References Cited in the file of this patent

UNITED STATES PATENTS

| | | |
|---|---|---|
| 69,193 | Dreusike | Sept. 24, 1867 |
| 1,884,828 | Perry | Oct. 25, 1932 |
| 2,549,768 | Bradley | Apr. 24, 1951 |
| 2,558,259 | Krug | June 26, 1951 |
| 2,702,588 | Zummach | Feb. 22, 1955 |